3,671,348
PRODUCTION OF TUBULAR ARTICLES
Kenneth Kemsey-Bourne, Harpenden, England, assignor to English Calico Limited, Manchester, England
Filed Mar. 23, 1970, Ser. No. 21,937
Claims priority, application Great Britain, Mar. 29, 1969, 16,592/69
Int. Cl. B65h 81/00
U.S. Cl. 156—187                                8 Claims

ABSTRACT OF THE DISCLOSURE

The present invention invention relates to improvements in the production of tubular articles produced by forming a strip of a plastics material having an insert embedded therein, helically winding the strip onto a mandrel so that adjacent edge portions overlap, bonding or welding the overlapping edge portions, the improvement being that reinforcing ribs, integral with and angled away from the continuous container wall are formed by using as the insert, a length of profiling strip and forcing a portion of the plastics material of the strip into conformity with a portion of the embedded profiling insert.

---

Figure 1:
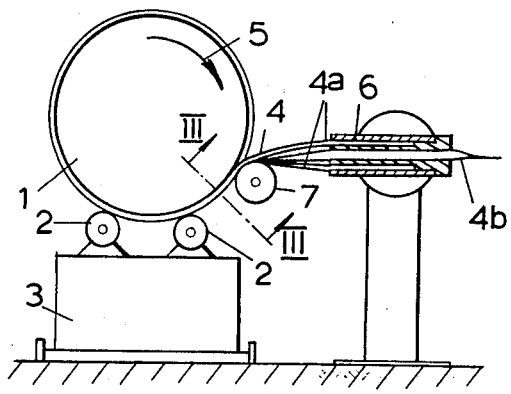

The present invention relates to improvements in processes for the production of tubular articles and more particularly, their production from a strip of a plastics material.

It has been proposed in French patent specification No. 1,461,246 (equivalent to British Pat. No. 1,105,830) to make tubular articles such as pipes and tanks by helically winding a strip of a plastics material round a mandrel. Adjacent edges of the strip which overlap or abut are welded together, for example by pressing the plastics material when soft, to form a smooth faced tube which can then be removed from the mandrel. It has also been proposed to form the strip by compressing a continuously extruded tube of plastics material. A continuous hollow reinforcing insert may be disposed within said plastics tube and the composite compressed together to form the strip simultaneously with being wrapped round the mandrel. The hollow reinforcing insert may also contain internal ribs so that, when the composite is compressed, the ribs prevent the reinforcing insert from being completely flattened whereby internal continuous channels are produced in the wall of the finished article. It should be noted that the container walls so produced have a substantially smooth inner and outer surface. This method however results in substantial quantities of plastics material being necessary to achieve a reasonable degree of strength and rigidity in the tubular product.

It has further been proposed in United Kingdom specification No. 1,127,756 that a strip of a plastic material be helically wound onto a mandrel which carries a separate profiling member, a profiling roller having a shape complementary to the profiling member being used to bend the strip to conform with the shape of the profiling member. This method results in some increase of strength and stability in the finished article but the article has a corrugated structure which is inherently non-rigid. Furthermore, the inside surface of the finished tank or pipe is undulating in nature and this means that, when used for liquids, and especially for the passage of liquids therethrough, the undulations will offer resistance to the liquid movement with the associated difficulties of slower liquid flow unless increased pressure is used and possibly more wear in the pipe walls with the increased combination of the liquid flowing through the pipes. Also the cleaning of pipes and vessels having such an undulating surface is inherently more difficult related to that of a vessel having relatively smooth walls. Also, the amount of plastics material used per article or unit of tube is similar to that used in the method of the aforesaid French patent specification No. 1,461,246.

It is an object of the present invention to provide a process for the production of pipes, tanks and similar tubular articles which at least retains and can increase the strength, stability and rigidity of the prior art pipes, tanks and the like whilst allowing a reduction to be made in the amount of expensive plastics materials used in the production of the article.

It has surprisingly been found that this object is achieved if in a process for the production of a tubular article comprising forming a strip of plastics material having an insert wholly embedded therein, and extending longitudinally therealong, either concurrently or subsequently, helically winding said strip round a mandrel such that adjacent edge portions of the strip overlap and welding or bonding the said overlapping edge portions, reinforcing ribs integral therewith and angled away from the continuous container wall are formed by using as the insert, a length of profiling strip, and forcing a portion of the plastics material of the strip into conformity with a portion of the embedded profiling insert.

It has further been found that, when the profiling insert has a thickness of at least one fifth the width of the strip excellent strength and/or rigidity characteristics are obtained. By "thickness," in relation to the profiling insert, is meant that dimension thereof along a radius in the finished tubular article.

Apart from its primary purpose of allowing the profiling of the plastics material as aforesaid, the profiling may itself act as a reinforcing member, since, in the majority of cases, it is more convenient to leave the profiling insert in position n the finished article than to remove same.

The profiling insert may, for example, be square or preferably circular in cross-section, preferably hollow, and may conveniently consist of a continuous length of a flexible metal tube such as a helically wound metal strip. Alternatively it may be solid for example rope.

The tubular articles made according to this invention show exceptional strength and rigidity, especially in withstanding lateral pressures in relation to the quantity of plastics material used.

Consequently, it is possible by the method of the present invention to extrude the strip containing the profiling insert in such a way that the quantity of plastics material between the profiling insert and the inner wall of the finished tubular article is reduced without seriously reducing the ability of the tubular article to withstand internal and external pressures. It is, however, essential that the thickness of the plastics material between the profiling insert and the inner wall of the finished article is not so far reduced that, for example, the insert is exposed to the interior volume of the article as this will not only reduce the strength of the article but will also interfere with the flow of liquid, if any, through the pipe; this may also cause a chemical reaction to occur between the material of the insert and the liquid in the pipe.

In a preferred embodiment therefore, the mandrel is coated with a layer of a plastics material before the plastic strip is helically wound thereon, thus guaranteeing that a minimum thickness of plastics material is present between the insert and the interior volume of the article, and that the insert does not protrude through the plastics wall and into the interior volume of the article.

In exceptional circumstances it may be desirable to produce an even stronger article as regards ability to withstand considerable pressure. It has been found that the process of the present invention may be used to produce a tubular article whose walls are constructed from two or more layers formed as described above, such an article having a honeycomb structure.

Therefore, according to a modification of the present invention, there is provided a process for the production of a tubular article characterised in that a one layered tubular article as described above is firstly formed in a similar manner to that described above, and one or more further layers of the strip of plastics material containing the profiling insert are helically wound on said first or subsequent layers, the edges and layers of the plastics strips subsequently being welded together.

A further feature of the above described modification, includes providing the article so formed with a flat outer surface by helically winding thereon a strip of plastics material not containing an insert, the strip of material preferably having a substantially rectangular cross-section.

It is preferred that the second and subsequent layers of the strip having embedded therein the reinforcing inserts be wound onto the mandrel while the previous layer is still soft, this ensuring that a good welding joint be effected between the layers.

The term "mandrel" includes any shaped member around which the plastics strip may be supported when wound. The widely used mandrel comprises a continuous drum or cylinder but this may be replaced for example by a similar shaped article constructed of spring strip-like members or the like.

Figure 2:
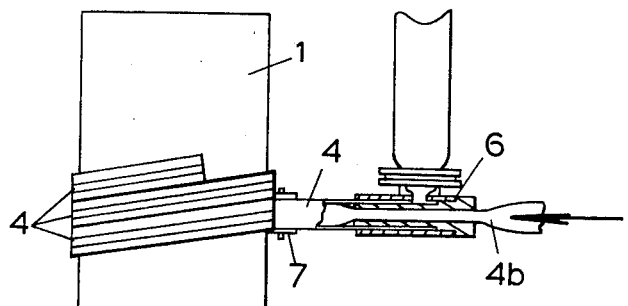
Figure 3:
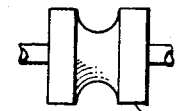
Figure 4:
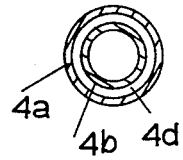
Figure 5:
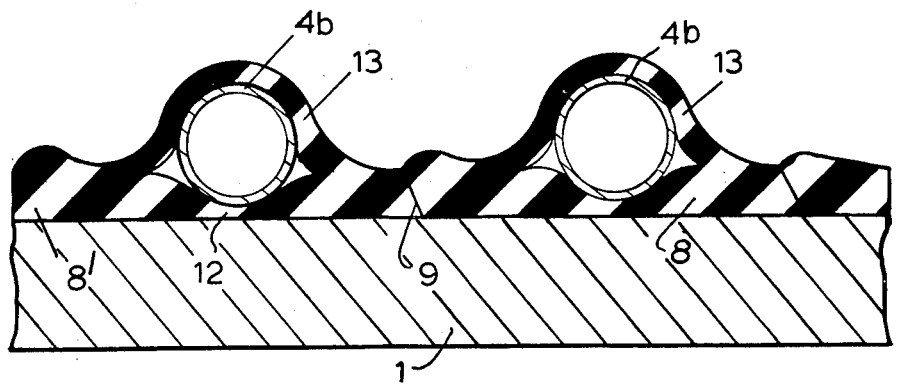
Figure 6:
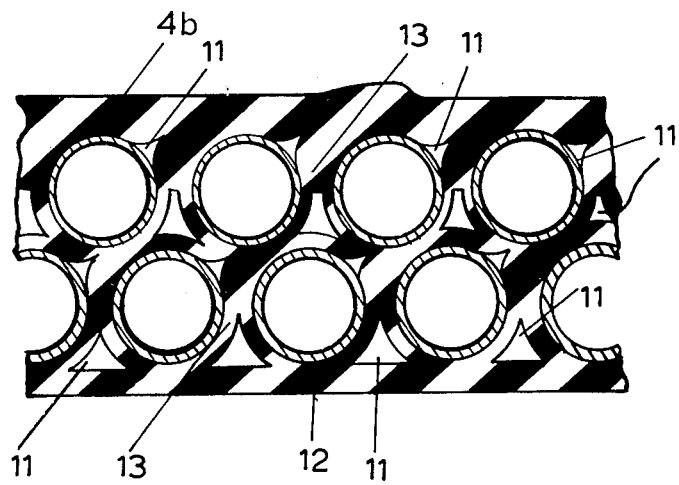

The invention will be further described by way of reference to the accompanying drawings which illustrate a specific embodiment of the present invention and in which:

FIG. 1 shows a diagrammatic side elevational view of a device for helically winding a reinforced strip continuously with the extrusion of the strip, FIG. 2 is a plan view of the device of FIG. 1, FIG. 3 is a cross-sectional view through a profiling roller used for pressing the strip, FIG. 4 is a cross-sectional view before pressing, through a strip which envelopes a profiling insert therein, FIG. 5 is a cross-sectional view through the wall of a single layer tubular article as made by the process of the present invention, and FIG. 6 is a similar cross-sectional view through a two layered tubular article made by the process of the present invention showing the honeycomb structure.

Referring to the drawings, a hollow cylindrical mandrel 1 is supported on rollers 2, one at least of which rollers is driven for rotation of the mandrel. The rollers are mounted on a slide 3 that can move in the axial direction of the mandrel and be displaced at a speed corresponding to the wrapping speed and the width of the plastics strip 4 being wrapped. The mandrel 1, rotating in the direction of the arrow 5 in FIG. 1, receives the strip 4 as it is extruded from a die 6 in the form of a hollow section, with spaced walls 4a between which a hollow profiling insert 4b is introduced from an axial hole in the die. The strip 4 containing the insert 4b is led on to the mandrel 1 and pressed by the shaped profiling roller 7, the edges of the adjacent turns of the strip being overlapped, the force applied by the roller being sufficient to effect welding or bonding together of the overlapped edges. The insert is *not* itself pressed, whilst the strip material on each side of the insert 4b is pressed to conform with the shape of the insert and thereby form angled rolls 13.

As is shown in FIG. 4 the hollow profiling insert 4b is initially spaced by a gap 4d from the hollow strip 4a enveloping it (the cylindrical hollow section shown being purely by way of example).

Referring to FIGS. 5 and 6, two strip portions 8 and 8' are shown in position on mandrel 1. A welded joint 9 has been formed where the two strip portions overlapped. Each strip portion has completely, embedded therein a hollow profiling member 4b, made from helically wound metal strip. The tubular article when taken off mandrel 1 has a continuous smooth inner surface 10.

FIG. 6 is a cross-sectional view of the "double tier" honeycomb version of the article wall illustrated in FIG. 5, the reinforcing members 4b being of the same helically wound metal strip.

On welding the two, or more, layers together small channels 11 may be formed which run substantially parallel to the reinforcing inserts 4b. A smooth surface 12 is again produced to constitute the article interior whilst a relatively smooth outer surface may be obtained by helically winding onto the previously formed layers, a strip of the plastics material containing no insert.

As stated above, through the profiling insert may add to the strength of the article, the major contribution is contributed by the walls 13 which give the article strength and stability equivalent to a much thicker walled article whilst allowing a large reduction in the amount of polymer used and therefore decrease in costs.

The process can be used with virtually any extrudable polymer material, preferably high density polyolefins, polyethylene and polypropylene being especially important.

A high density polyethylene having the following properties has been found to be very suitable:

Specific gravity _____ 0.952.
Melting point _____ 127–131 deg. C.
Softening point _____ 118 deg. C.
Moisture absorption _____ Almost zero.
Coefficient of expansion _____ $2 \times 10^{-4}$ deg. C.
Specific heat _____ 0.56.
Elastic recovery _____ Good.
Dielectric constant _____ 2.3.

The insert may be wholly embedded in the strip whilst the helically winding operation to form the article is being effected by firstly providing the mandrel with a first layer of the plastics material and subsequently helically winding thereon the profiling insert and a second layer of the plastics material so that the insert is "sandwiched," so to speak, between said first and second layers, during the bonding and profiling operations.

I claim:

1. In a process for the production of a rigid tubular article having a continuous container wall comprising forming a strip of a plastics material having an insert wholly embedded therein, and extending longitudinally therealong, helically winding said strip round a mandrel such that adjacent edge portions of the strip overlap, and securing the said overlapping edge portions, the improvement being that reinforcing ribs, integral therewith and angled away from the continuous container wall are formed by using as the insert, a length of profiling strip, and forcing a portion of the plastics material of the strip into conformity with a portion of the embedded profiling strip such that the profiling strip is surrounded on all sides by the plastics material.

2. The process as set forth in claim 1 wherein the profiling insert has a thickness of at least one fifth the width of the plastics strip.

3. The process as set forth in claim 1 wherein the overlapping edge portions of adjacent strips are welded simultaneously as the portion of the plastics strip is forced into conformity with said profiling insert.

4. The process as set forth in claim 1 which further comprises helically winding onto the thus formed tubular article at least one additional layer of said strip, having embedded therein the profiling insert, the further one or more layers being bonded or welded together, and to the immediate underlying layer, and profiled according to the process set forth in claim 1.

5. The process as set forth in claim 4 wherein, around the last of the layers having the profiling strip embedded therein, a plain strip of plastics material is helically wound and secured thereto so as to provide the tubular article with a relatively smooth outer surface.

6. Process as set forth in claim 1 wherein the plastics material is a polyolefin.

7. Process as set forth in claim 6 wherein the polyolefin is polypropylene.

8. Process as set forth in claim 1 wherein the profiling insert has been embedded in said strip by introducing said strip internally of an extruding die for the strip portion which is of hollow form so that, upon profiling, the material of the hollow strip portion is pressed to both sides of the profiling insert.

References Cited

UNITED STATES PATENTS

| | | | |
|---|---|---|---|
| 3,477,891 | 11/1969 | Hawerkamp | 156—195 X |
| 2,430,081 | 11/1947 | Roberts et al. | 156—187 X |
| 3,252,483 | 5/1966 | Swan | 156—195 X |
| 2,722,263 | 11/1955 | Beare et al. | 156—195 X |
| 3,296,047 | 1/1967 | Parr | 156—187 X |
| 3,192,088 | 6/1965 | Larivieve | 156—195 X |
| 3,089,535 | 5/1963 | Vohrer et al. | 156—195 X |

CARL D. QUARFORTH, Primary Examiner

G. G. SOLYST, Assistant Examiner

U.S. Cl. X.R.

156—191, 195, 244